April 7, 1970 P. R. LINLEY ET AL 3,504,441
APPARATUS FOR COMPARING WITH A LENGTH STANDARD THE SPACING
OF TEST POINTS IN A WORKPIECE
Filed Sept. 8, 1967 2 Sheets-Sheet 1

INVENTORS
Philip R. Linley
Francis M. Linley, Jr.
BY R.D. Smith
ATTORNEY

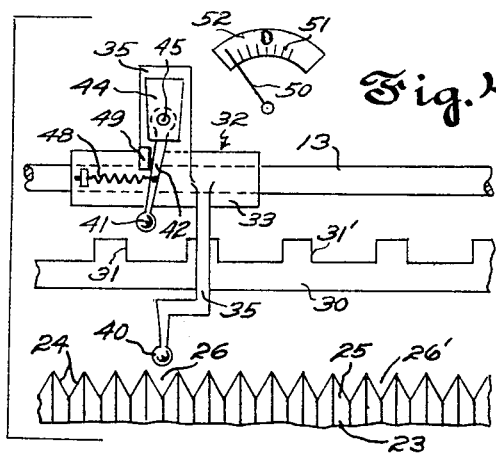
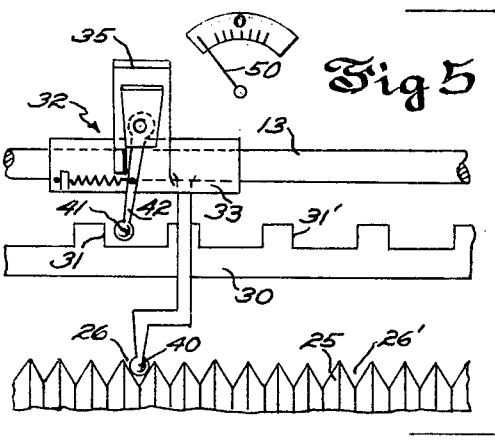
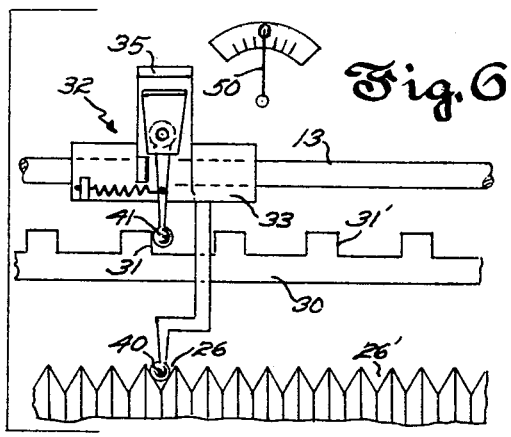
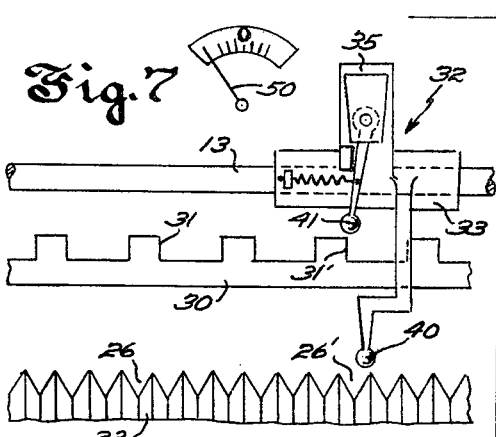
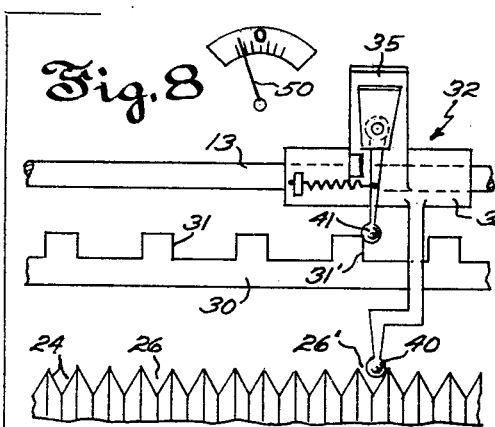
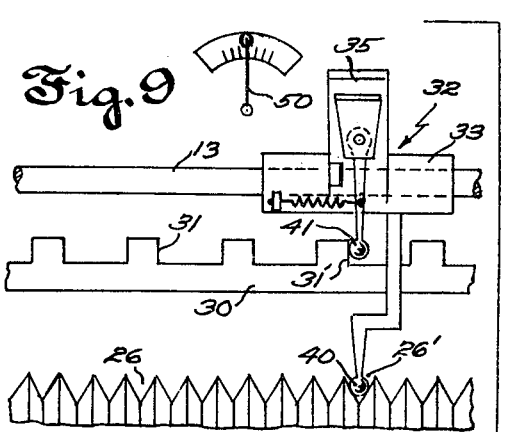
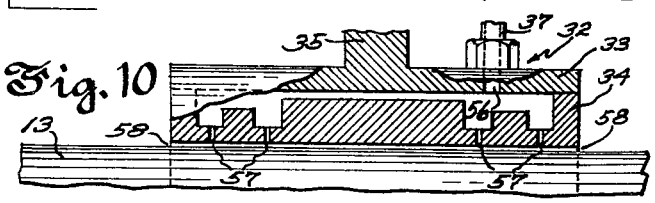

United States Patent Office 3,504,441
Patented Apr. 7, 1970

3,504,441
APPARATUS FOR COMPARING WITH A LENGTH STANDARD THE SPACING OF TEST POINTS IN A WORKPIECE
Philip R. Linley, Fairfield, and Francis M. Linley, Jr., Easton, Conn., assignors to Universal Thread Grinding Company, Fairfield, Conn., a corporation of Connecticut
Filed Sept. 8, 1967, Ser. No. 666,274
Int. Cl. A61b 5/08, 5/10; B23f 23/08; B23q 17/04; G01d
U.S. Cl. 33—174                                9 Claims

ABSTRACT OF THE DISCLOSURE

An apparatus for ascertaining with extreme precision any disparity between spacings that separate test points in a specimen workpiece, and spacings that separate corresponding target points in a length standard such as a graduated gauge. The test points on the workpiece may comprise a straight row of shoulders formed by flanks of screw threads that are slanted in relation to the plane of movement of a pilot probe into contact therewith. The target points on the gauge comprise another straight row of shoulders paralleling and disposed closely beside the row of slanted workpiece shoulders so as to be contacted by a sensing probe mounted on a common carriage with the pilot probe.

The sensing probe is cooperative with the gauge shoulders to measure and register displacement of the sensing probe from a calibrated relationship to the pilot probe for ascertaining minute errors in the distances between test points in the workpiece.

BACKGROUND AND FIELD OF THE INVENTION AND STATE OF THE PRIOR ART

The accuracy limiting factor in length measurement is not confined to physical characteristics of the actual length standard. Very accurate standards such as step gauges and light wave standards are now available. Among the problems that remain is that of accurately comparing units of length in a specimen with units of length in the standard. Way inaccuracy is a major source of trouble in making such comparison. No comparing apparatus can perform better than the fidelity of transferring dimensions from the specimen to the error indicating means. In the transfer much depends on variable tilt angles, pitch, roll and yaw in the frame structure and in the mounting of movable parts of the apparatus because the ideal condition of coaxial alignment of all parts concerned is impractical to attain except in such simple measuring instruments as the screw micrometer. In more sophisticated measuring and comparing apparatus there must be offset relationships between the specimen and the length standard in the interest of space saving and avoidance of distortion due to heat transfer effects.

SUMMARY OF THE INVENTION

It is an object of the present invention to provide a measuring means which will reduce errors due to way inaccuracy. Attainment of this object is aided by locating the length standard and the work piece as close together as possible in a parallel, side by side relationship with practically no relatively movable intervening parts.

Another object of the invention is to provide a rapid means to check by comparison with a length standard the accuracy of the lead of a screw thread. When an initial zero setting is established on an indicator, in calibrating the presently improved apparatus, the testing operation is performed simply by lifting a probe moving handle and setting the probe into engagement with an advanced thread on the workpiece whereupon the exact extent of lead error will be registered on the indicator.

It is a further object of the present invention to use one and the same special bearing to reduce friction in the movement of a probe carriage laterally and transversely of a track along which the carriage is slidable whereby to place a pilot probe and the probe of a sensing transducer into operative relation to the workpiece and the standard of length respectively.

The foregoing and related objects of the improvement will be apparent from the following description of a preferred embodiment of the invention having reference to the accompanying drawings wherein:

DESCRIPTION OF THE DRAWINGS

FIGURE 4 represents diagrammatically the cooperative working parts of the apparatus of FIGURE 1 including a specimen workpiece, a graduated length standard or gauge, and differentially movable probes borne by a common carriage that turns and slides on the same axis, by which means both probes are moved into engagement with the workpiece and gauge respectively.

FIGURE 5 represents the carriage positioning probe manually lowered into engagement with the workpiece, and the other or sensing probe correspondingly lowered to a zone for making contact with the gauge.

FIGURE 6 represents the gauge shifted toward the right to an adjusted position for bringing the sensing probe into calibration with the carriage positioning probe which automatically results in swinging of an indicating pointer to zero position on an over-and-under dial.

FIGURE 7 represents both probes, now calibrated in accordance with the gauge, lifted clear of the workpiece and gauge and moved to the right into positions for testing the exact equality of a spacing in the workpiece with a corresponding master spacing in the gauge. The dial pointer as in FIGURE 4 has dropped away from working register with the scale.

FIGURE 8 represents both probes beginning to be lowered again into engagement with the workpiece and the gauge.

FIGURE 9 represents the ultimate full engagement of the probes with the new test point on the workpiece and with an advanced shoulder on the master gauge. If the spacing of the test points on the workpiece exactly equals the spacing of the contacted shoulders on the gauge the dial pointer will resume zero position. Otherwise the extent of the disparity of spacings can be read off on the graduations of the dial.

FIGURE 10 is a fragmentary view of the air bearing shown in section on the plane 10—10 in FIGURE 1.

DESCRIPTION OF THE PREFERRED EMBODIMENT

Figure 1:
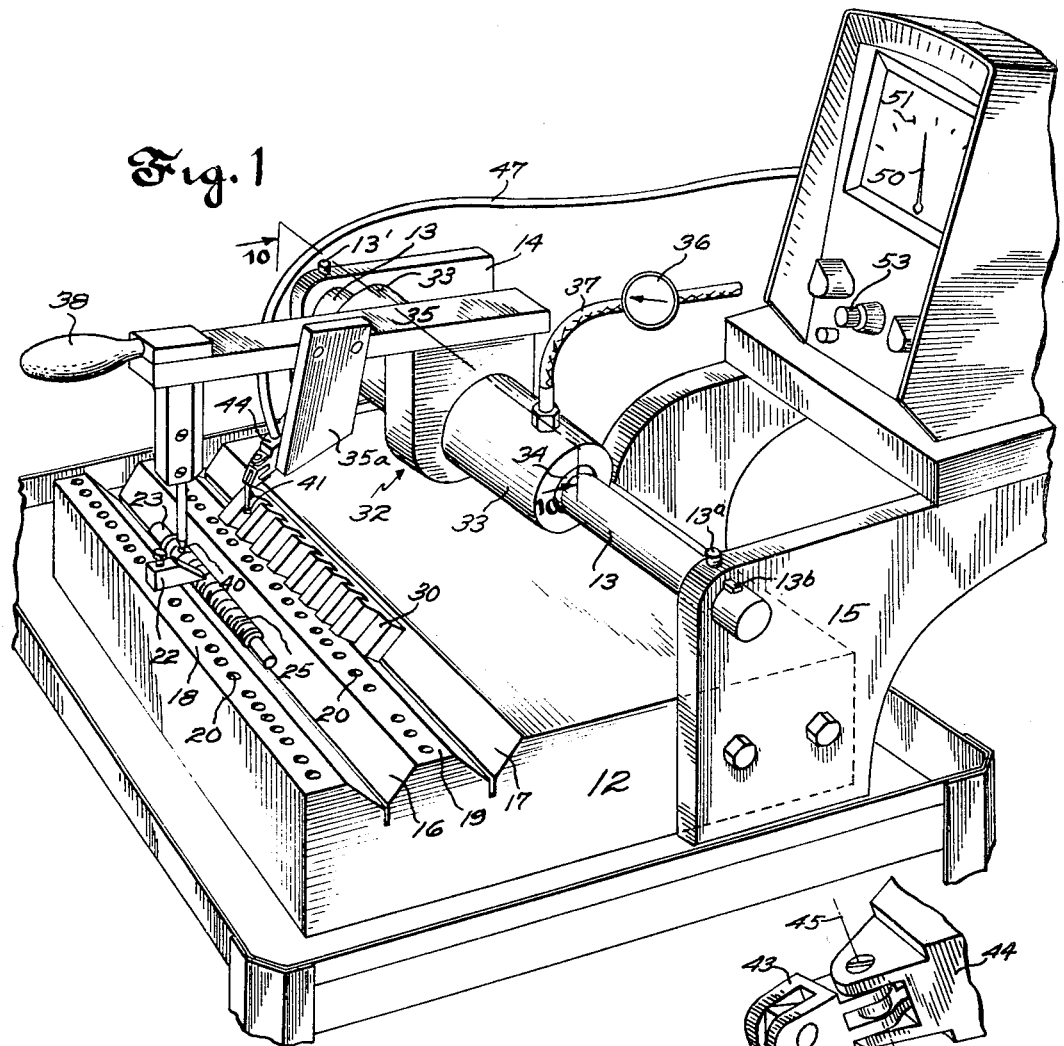
FIGURE 1 is a perspective view of an improved space checking apparatus incorporating the present improvements and illustrative of the invention.
Figure 2:
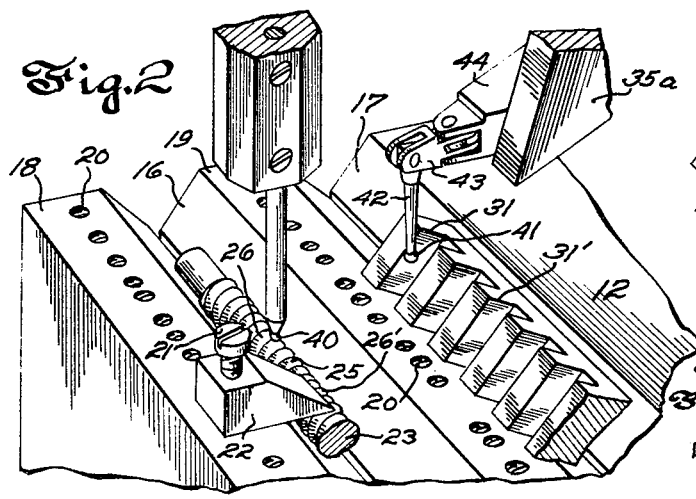
FIGURE 2 shows a portion of FIGURE 1 drawn on an enlarged scale.
Figure 3:
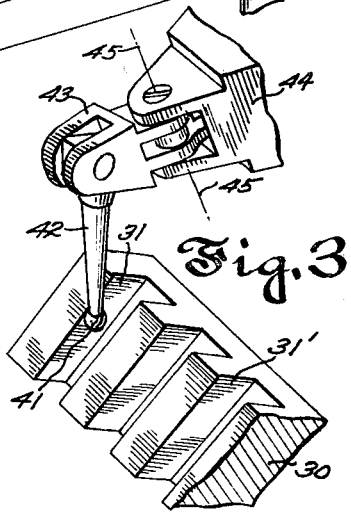
FIGURE 3 shows a portion of FIGURE 2 drawn on a still further enlarged scale.

For minimizing inaccuracies of measurement resulting from way errors in the structure of the apparatus such as deviation from true parallel relationship of ways or from designed angularity of paths in which working parts of the apparatus are held or guided to move, a framework is provided that includes a platform type of base 12 over which there is supported with limited freedom for lengthwise expansion or contraction a rigid cylindrical track rail 13 whose ends are stationed on short standards 14, 15 upstanding from the base. Freedom for lengthwise expansion of rail 13 resulting from temperature changes to avoid consequent distortion of the framework can be provided by interposing a spline such as 13b between a set screw 13a and the rail. Near its front, the base has in its top surface as means to station a workpiece parallel, V-shaped seating grooves or ways 16 and 17 flanked respectively by landings 18 and 19 each containing a row of tapped holes 20. In any of these holes screws such as 21 can be inserted and tightened down against one or more work clamps 22 that overhang the groove as a means of holding stationary but removably in the groove 16 a specimen workpiece 23. The workpiece has contours providing a straight row of test points that are herein represented by the slanting flanks 24 of V-shaped screw threads 25 bordering valleys 26, 26' between the threads.

A serrate, bar type of gauge 30 serves as the length standard or gauging object and has contours providing a straight row of acurately spaced shoulders or target points 31. Gauge 30 is seated in the groove 17 of the base so as to be adjustable endwise therein in fine increments of movement for calibrating the apparatus in preparation for use say to compare the spacing of valleys 26, 26' in the workpiece with the spacing of shoulders 31, 31' in the gauge.

At the rear of the base groove 17 a carriage 32 includes an elongate hub 33 that is free to swing and also to slide on the track rail 13 by virtue of a substantially frictionless bearing 34 which may be of the pressurized fluid type, such as an air bearing of the kind shown in FIGURE 30 on page 459 and elsewhere in the work titled, "First International Symposium on Gas-Lubricated Bearings," published by the U.S. Government Printing Office, edited by Dudley D. Fuller of The Franklin Institute, chairman of the Symposium. This publication is further identified as ACR–49 Office of Naval Research—Department of the Navy. Bearing means 34 while vertically frictionless nevertheless permits no looseness or freedom of play between rail 13 and the carriage hub 33.

Pressurized air or other pressurized fluid may be furnished constantly to bearing 34 from a suitable pump 36 through a very flexible tubing 37 that offers practically no resistance to movements of carriage 32. In FIGURE 10 air enters the bearing at 56, passes through orifices 57 and leaves the bearing at 58.

On carriage 32 which extends across both the aforesaid rows of points there is firmly fixed a forwardly extending arm 35 that overhangs the base grooves 16 and 17. Arm 35 carries near its front end a detector or pilot probe 40 which depends fixedly therefrom for carriage positioning engagement with the specimen workpiece 23 by means of a ball contact point at its lower extremity. Between probe 40 and carriage hub 33 arm 35 carries a gauge sensing detector in the form of probe 41 that its movable relatively to the arm and carriage and has a ball contact point at its lower extremity as does pilot probe 40.

While there are varieties of conventional ways in which probe 41, by sensing the gauge shoulders 31, 31' can be made to register the translational position of carriage 32 along the track rail 13, the sening probe 41 shown herein has a stem 42 which is pivoted in a transducer casing 44 fixed on a bracket 35a that depends fixedly from arm 35 and swings gaugingly about the axis 45 in an arcuate path whose tangent parallels the sliding movement of carriage 32 along track rail 13. Such sliding movement, when the contact point 46 of probe 41 contacts a shoulder 31 of the gauge 30, will cause the stem 42 of the probe to swing about the pivot 45 in the transducer casing 44, and such swinging motion of the probe becomes automatically converted by the transducer 44 into electro magnetic effects in an electric circuit that includes a flexible electric cable 47 and a motivator (not shown) for the indicator pointer 50 of a graduated over-and-under scale 51 on the dial 52. High-magnification electric gauging equipment that will serve the purpose of dial 52 and indicator pointer 50 is now commercially available from various sources including electronic gauges that have dials graduated and readable to millionths of an inch. An example of such equipment is marketed under the mark "Last Word," a registered trademark of The L. S. Starrett Company, of Athol, Mass., U.S.A.

The probe stem 42 is swingably adjustable, but normally fixed, on a hinge block 43 so that probe 42 in measuring use swings only with the hinge block about axis 45.

An example of the use of the herein disclosed apparatus for checking the accuracy of lead of a screw thread is next described with particular reference to the flow diagrams in FIGURES 4 to 9, inclusive.

In FIGURE 4, for calibrating the apparatus with the workpiece 23 held stationary in its seating groove 16 in the base 12 by means of clamp 22, workpiece contacting pilot probe 40 and gauge sensing probe 41 are manually held in lifted position by means of the handle 38 on arm 35.

While so lifted they have been positioned by sliding their common carriage 32 into position lengthwise of rail 13 enabling approximate register of probe 40 with a valley 26 of the screw thread 25 when the probe is lowered thereagainst. By means of a biasing spring 48, sensing probe 41 is constantly urged toward the left in FIGURE 4 to a position where its stem 42 is arrested by a stop 49 on the transducer casing 44 in a non registering position that causes indicator pointer 50 to be absent from a scale 51 of readable graduations. Parts functionally equivalent to spring 48 and stop 49 are often located within the transducer casing but are here illustrated as external thereto for clarity of explanation of how the transducer and sensing probe operate.

Both probes 40 and 41 are next lowered simultaneously in unison by permitting carriage 32 to turn on rail 13 responsively to the weight of arm 35 until the positioning probe 40 comes to seat centrally in the valley 26 of the screw thread as shown in FIGURE 5. Here the sensing probe has dropped to a level where it can be contacted by a shoulder 31 of the gauge bar 30. Indicator pointer 50 remains off the readable graduations of dial scale 51.

Although bar 30 is heavy enough to remain yieldingly stationed along the base groove 17 it can now however be shifted manually endwise toward the right until gauge shoulder 31 contacts and propels sensing probe 41 sufficiently toward the right to bring indicator pointer 50 exactly to zero position on the dial scale 51 as shown in FIGURE 6. This completes the preliminary calibrating of the apparatus which is now ready for subsequent use to compare the spacing of selected test points, such as say valley 26' from valley 26 in the workpiece, with the master spacing of corresponding shoulder 31' from shoulder 31 in the gauge bar.

With the apparatus so calibrated the user proceeds to compare the said spacings of selected test points in the workpiece with spacings of corresponding shoulders on the gauge bar by first lifting the arm 35 to be clear of the workpiece and gauge as in FIGURE 4. By means of handle 38 the carriage 32 is then shoved to the right, say as far as in FIGURE 7, where the spacing of valley 26' from valley 26 can be tested in relation to the length standard or gauge bar 30 which remains stationed as in FIGURE 6. Here it will be noted that the sensing probe 41 and indicator pointer 50 have resumed their slant toward the left as in FIGURE 4.

Now by lowering probe 40 into valley 26' merely by gravity and while gauge bar 30 still remains stationed as in FIGURE 6, both probes will drop through their intermediate positions in FIGURE 8 to their testing positions in FIGURE 9, the bearing 34 as aforesaid being virtually frictionless and enabling the carriage to move without drag in slave fashion in response to the force of probe 40. This causes pointer 50 to again approach zero on the dial scale. If the spacing of valley 26' from valley 26 accurately equals the spacing of gauge shoulder 31' from shoulder 31, pointer 50 will reassume its exact zero position as in FIGURE 6. If not, the disparity will be registered and read out as millionths of an inch, plus or minus, on the scale of graduations 51.

Many modifications of the exact construction herein illustrated and described will be suggested to the reader by this disclosure for embodying the principles of structure and operation herein claimed. For instance the workpiece may be placed in base groove 17 and the gauge bar in groove 16 and the probes may be interchanged in their positions on the carriage arm 35. Support of a screw threaded workpiece on centers as in a lathe may be substituted for groove seating of the workpiece, such apparatus "centers" having rigid support on the base 12. In this case adjustable turning of the workpiece on its centers can more conveniently be resorted to in connection with calibrating the apparatus. To attain calibration the workpiece would be turned on its centers while valley 26 is engaged by pilot probe 40 until the indicator pointer registers zero or is within the range of the fine setting knob 53 with which electronic gauges are usually equipped. The workpiece would then be clamped against rotation.

Magnetism may be employed to retain the workpiece and/or gauge bar shiftably in their seating grooves. The gauge shoulders 30 might be inclined instead of square and at least one of the valley bordering sides 24 in the workpiece might be square. The pilot probe 40 could be bifurcate instead of ball pointed and thus straddle the crest of the screw thread. The valleys 26, 26', etc., instead of being helical like screw threads could be planar grooves afforded by mere notches or indentations in the workpiece. Neither the hub 33 of carriage 32, nor its bearing 34 need be fully cylindrical but preferably shall be at least half cylindrical and can merely rest tiltably on the track rail 13.

The underlying principles of the apparatus construction take into account and provide a solution for several types of defect which have militated against extreme accuracy in attempts to measure work in millionths of an inch by means of apparatus heretofore available. Placing the workpiece closely beside the gauge bar and insuring elimination of shift in the angulation of arm 35 by means of the considerable length of the carriage hub 33 prevent so-called "Abbe" errors due to tilt, pitch, roll and yaw. As shown in FIGURE 1 and claimed hereinafter the workpiece and the standard of length are each at a substantially greater distance laterally from track rail 13 than is the distance between the workpiece 23 and the standard of length 30.

What is claimed is:

1. Apparatus for gauging units of length between test points located in a straight row in an elongate specimen workpiece by comparison with units of length in a parallel straight row in an elongate standard of length offset laterally from said workpiece, comprising the combination of, a framework including both a rigid straight track rail and means to fixedly position a workpiece having contour providing a straight row of contactable test points so that said row extends parallel to and is offset laterally from said rail, an elongate standard of length stationary on said framework having contours providing a straight row of contactable target points disposed alongside said row of test points and parallel thereto, a carriage extending crosswise both said rows of points translationally movable along said track rail and also swingable thereabout in selective planes normal to the rail, pilot means fixedly mounted to said carriage in position to be brought into contact with any of said test points by said translational and swingable movement of the carriage, a carriage positioner operative to move said carriage translationally along said track rail to stations corresponding to selected test points of said workpiece, sensing means mounted on and relatively to said carriage so as to be gaugingly movable relatively thereto in directions substantially parallel to the row of target points of said standard of length, substantially frictionless bearing means operationally free of all play mounting said carriage on said track rail in a manner to permit both said swingable and translational movements of said carriage, said bearing means being constructed and arranged to limit said swingable movement of the carriage to planes which are precisely normal to said track rail and to enable the carriage to make all of its movements without drag and in slave fashion in response to forces applied to said carriage positioner and to the reactive guiding forces on the carriage of the pilot means as the latter is made to transverse the contours of the workpiece, and means operative automatically to indicate the extent of gauging movement of said sensing means, whereby to compare the spacing apart of said test points along one of said rows with the spacing apart of target points along the other of said rows.

2. Apparatus as defined in claim 1, in which the said workpiece supporting means and the said standard of length are arranged on the said framework in relatively close together parallel relation, each at a substantially greater distance from the said track rail than is the distance between said work supporting means and said standard of length, whereby to reduce precision defects due to way errors in use of the apparatus for comparing said workpiece with said standard.

3. Apparatus as defined in claim 1, in which the said framework includes a base having a platform surface, and two contiguous parallel grooves sunk in said surface, one of said grooves providing a seat operative to position the said workpiece and the other of said grooves seating the said standard of length in a variety of longitudinal positions for calibrating the apparatus.

4. Apparatus as defined in claim 1, in which the said bearings include a partially confined body of pressurized fluid continuous throughout a common space separating the said carriage and the said track rail.

5. Apparatus as defined in claim 1, in which the said test points of the said workpiece comprise valleys bordered by said surfaces of a screw thread, and the said target points comprise shoulders on the said standard of length, and the said pilot means comprises a pilot probe borne by the said carriage in a position to be seated in selected valleys in said workpiece in a manner to station said carriage along the said track rail, and the said sensing means comprises a transducer borne by said carriage having a sensing probe projecting therefrom for engagement with selected target shoulders of said standard of length while said carriage is stationed by said pilot probe, together with registering means responsive to said transducer in a manner to indicate extents of movement of said sensing probe relative to said transducer.

6. Apparatus as defined in claim 5, in which each of the said probes terminates in a ball contact point, each of said points being so positioned on the said carriage that a straight line passing through the centers of both contact points approximately intersects the central axis of the said track rail.

7. Apparatus as defined in claim 5, in which the said standard of length is a serrate bar forming the said target points and supported on the said framework in a manner to be adjustable endwise thereon in relation to the said sensing probe for calibrating the apparatus with respect to the standard of length.

8. Apparatus as defined in claim 1, in which the said framework includes means to mount the said rail on the said workpiece supporting means with sufficiently yield to prevent distortion of said framework by expansion or contraction of said rail due to variation of temperature.

9. Apparatus for gauging slight disparities between the spacing of test points aligned in a row along a work object and the spacing of corresponding target points aligned in a flanking row extending along a standard of length, comprising the combination of, framework including a straight track, a first way on said framework at one side of said track operative to support a work object having a row of test points paralleling said track, a standard of length stationed on said framework at the said side of said track having a row of target points parallel to and laterally offset from said row of test points, a carriage slidable along said track in a path substantially farther distant from either of said rows of points than the proximity of said rows to each other, two probes on said carriage located closer to each other than to said track in a direction crosswise said rows of points and positioned to be placed respectively in register with one of said test points and one of said target points simultaneously, at least one of said probes being movable lengthwise of said track relatively to said carriage and to the other detector, and means sensitive to relative movement between said probes operative to indicate the extent of said relative movement and thereby any disparity between the spacing of said test points and the spacing of said target points.

References Cited

UNITED STATES PATENTS

| | | | |
|---|---|---|---|
| 1,652,435 | 12/1927 | Goodrich | 33—179.5 |
| 3,226,837 | 1/1966 | Wilkie et al. | 33—174 |
| 2,914,861 | 12/1959 | Flair | 33—179.5 |
| 2,504,961 | 4/1950 | Braaten | 33—174 |

SAMUEL S. MATTHEWS, Primary Examiner

U.S. Cl. X.R.

33—199